3,121,702
CALCIUM SULFATE PLASTERS CONTAINING ALKYL ACRYLATE COPOLYMERS
Allan E. Sherr, Norwalk, Conn., and Joseph Roshal, Bronx, N.Y., assignors to American Cyanamid Company, New York, N.Y., a corporation of Maine
No Drawing. Filed Sept. 9, 1959, Ser. No. 838,846
7 Claims. (Cl. 260—41)

This invention relates to plaster compositions and more particularly to methods for improving calcium sulfate plaster mixes of the type of gypsum plaster or stucco, mixes for wall board manufacture and the like. The principal calcium sulfate plaster-forming materials are calcium sulfate hemihydrate obtained by calcining either rock gypsum or by-product calcium sulfate, dead burned gypsum or Keene's cement, and mixtures of the two.

A wide variety of objects in addition to wall board are molded from calcium sulfate hemihydrate or plaster of Paris or its mixture with Keene's cement, with or without the incorporation of fillers such as wood flour and the like. Such molded objects have fairly good strength, but are quite water-absorptive; i.e., they undergo a material gain in weight when immersed in or drenched with water. It is a principal object of the present invention to provide a method for reducing the water absorption of such calcium sulfate plasters. It is a further object to provide a class of additives capable of reducing the water absorption of plasters when present in such small amounts that they do not affect the appearance, color or other desirable properties of molded objects.

In accordance with the invention small quantities of copolymers of alkyl acrylate monomers with acrylic acid or acrylonitrile are incorporated uniformly into calcium sulfate plasters. We have found that an appreciable reduction in the water absorption of objects molded from plaster of Paris is obtainable when as little as 0.0002% of such a copolymer is incorporated into a plaster-water molding mixture. From this minimum the quantities of copolymer suitable for use in practicing the invention may range upwardly to 1.5–2% or more, based on the dry weight of the plaster. Larger quantities than 2% may be used, but are seldom advisable as above this level the increase in water resistance is not proportional to the further quantities of copolymer added.

Products capable of reducing the water absorption of calcium sulfate plasters are obtained by copolymerizing about 50–90% by weight of an alkyl acrylate monomer in which the alkyl radicals contain from 1 to 6 carbon atoms with about 50–10% of acrylonitrile or of acrylic acid. If desired, the alkyl acrylate-acrylic acid copolymers may be converted into their alkali metal or ammonium salts by adding an aqueous alkali metal hydroxide such as sodium hydroxide or by adding ammonium hydroxide solution to the finished copolymer.

The copolymers of acrylonitrile with alkyl acrylates in which the alkyl radicals contain from 1 to 6 carbon atoms are well known, and therefore need not be described in detail. A suitable method for their preparation is described in U.S. Patent No. 2,868,752, although it will be understood that they can be prepared by other methods. The copolymers of acrylic acid with alkyl acrylates are also well known, as are the alkali metal and ammonium salts obtained by neutralizing them with aqueous alkalies. It has been found that mixtures of such solutions with methylated methylol melamines and particularly with hexakismethoxymelamine are also useful in reducing the water absorption of calcium sulfate plasters, and such mixtures constitute an additional feature of the invention.

The copolymers described above are conveniently incorporated into calcium sulfate plasters by suspending them in the water used to hydrate plaster of Paris, Keene's cement or mixtures thereof. Dry plasters containing one or more of the copolymers in uniform admixture constitute an important article of commerce and are therefore included within the scope of the invention in its broader aspects; such mixtures are preferably prepared by mixing a suitable aqueous suspension of the copolymer with gypsum before it is converted into plaster of Paris or anhydrite by calcination.

The invention will be further described and illustrated by the following specific examples to which, however, it is not limited.

EXAMPLES

*Polymer A.*—An emulsion copolymer of 70 parts of ethyl acrylate and 30 parts of acrylonitrile prepared as described in Example 7 of U.S. Patent No. 2,868,752.

*Polymer B.*—A copolymer of 85 parts by weight of butyl acrylate and 15 parts of acrylic acid prepared from a solution of the two monomers in 11 parts of dioxane. To this solution there are added 2 parts of di-tert.-butyl peroxide and 0.4 part of butyl mercaptan and the solution is refluxed for 4–6 hours. The copolymer is converted into its ammonium salt by neutralization with an excess of aqueous ammonium hydroxide to a solution containing 41% solids.

*Polymer C.*—To 150 parts by weight of the 41% solution of polymer B there are added 35 parts of hexakismethoxymelamine, which is a methylated hexamethylol melamine having a molecular weight of 390, 0.7 part of p-toluene sulfonic acid and 10 parts of water followed by agitation until a solution of 50% solids content is obtained.

Test patties were prepared by charging a 175 ml. stainless steel cup with 40 ml. of water or of a water suspension of the copolymer under test and adding 50 grams of plaster of Paris. The mixture is allowed to stand for 15 seconds, is stirred with a spatula for 2 minutes and is then dumped onto wax paper on a flat, level surface. The set time is measured from the time of dumping until a Vicat needle will no longer penetrate the plaster, and is reported in minutes. The average diameter of the set patty is measured carefully since it shows the effect of the copolymer on the water-retaining power of the wet plaster mix. After each patty had set thoroughly it was placed in water at room temperature and the gain in weight after 48 hours soaking was measured and reported as percent water absorbed.

In the following table the quantity of copolymer used as additive is reported as percent polymer solids on the weight of the dry plaster.

| Sample No. | Polymer A | Set Time | Patty Diameter | Water Absorbed |
|---|---|---|---|---|
| 1 | None | 27 | 4 3/16 | 43.80 |
| 2 | 2.0 | 158 | 3 7/16 | 31.42 |
| 3 | 0.2 | 41 | 4 7/16 | 39.74 |
| 4 | 0.02 | 41 | 4 19/16 | 37.21 |
| 5 | 0.002 | 41 | 4 8/16 | 40.58 |
| 6 | 0.0002 | 36 | 4 11/16 | 44.00 |
| | Polymer B | | | |
| 7 | None | 43 | 4 19/16 | 41.64 |
| 8 | 2.0 | 170 | 2 5/16 | 18.29 |
| 9 | 0.2 | 35 | 3 19/16 | 40.96 |
| 10 | 0.02 | 40 | 3 3/16 | 40.53 |
| 11 | 0.002 | 40 | 4 5/16 | 42.25 |
| 12 | 0.0002 | 40 | 4 3/16 | 41.27 |
| | Polymer C | | | |
| 13 | None | 21 | 4 3/16 | 46.15 |
| 14 | 2.0 | 186 | 4 3/16 | 28.16 |
| 15 | 0.2 | 34 | 4 3/16 | 41.93 |
| 16 | 0.02 | 24 | 4 5/16 | 42.65 |
| 17 | 0.002 | 27 | 4 3/16 | 44.26 |
| 18 | 0.0002 | 29 | 4 3/16 | 43.84 |

All of these compositions reduce the water absorption of the set plaster and polymer A also lengthens materially the setting time of the plaster. Polymer B increases the plasticity or water-retaining power of the wet plaster-water mixes, and is therefore a valuable additive for calcium sulfate plasters of the type used in patching and for filling the joints between plaster boards.

What we claim is:

1. A method of reducing the water absorption of calcium sulfate plasters which consists essentially in incorporating therein from 0.0002% to about 2%, based on the dry weight of the plaster, of a copolymer of about 50–90 parts by weight of an alkyl acrylate monomer in which the alkyl radicals contain from 1 to 6 carbon atoms with about 50–10 parts of a vinyl monomer selected from the group consisting of acrylic acid and acrylonitrile.

2. A method of reducing the water absorption of calcium sulfate plasters which consists essentially in incorporating therein from 0.0002% to about 2%, based on the dry weight of the plaster, of a copolymer of about 50–90 percent by weight of ethyl acrylate and about 50–10 percent of acrylonitrile.

3. A method of reducing the water absorption of calcium sulfate plasters which consists essentially in incorporating therein from 0.0002% to about 2%, based on the dry weight of the plaster, of a copolymer of about 50–90 percent by weight of butyl acrylate and about 50–10 percent of acrylic acid.

4. A method of reducing the water absorption of calcium sulfate plasters which consists essentially in incorporating therein from 0.0002% to about 2%, based on the dry weight of the plaster, of a mixture of hexakismethoxymelamine and the ammonium salt of a copolymer of about 85 parts by weight of butyl acrylate with about 15 parts of acrylic acid.

5. A calcium sulfate plaster consisting essentially of a mixture of a hydratable calcium sulfate and from 0.0002% to about 2% by weight, based upon the dry weight of the plaster, of a copolymer of about 50–90 parts by weight of an alkyl acrylate monomer in which the alkyl radicals contain from 1 to 6 carbon atoms with about 5–10 parts of a vinyl monomer selected from the group consisting of acrylic acid and acrylonitrile.

6. A composition according ot claim 5 in which the copolymer is an ethyl acrylate-acrylonitrile condensation product.

7. A composition according to claim 5 in which the copolymer is a butyl acrylate-acrylic acid copolymer.

References Cited in the file of this patent

UNITED STATES PATENTS

| | | |
|---|---|---|
| 2,311,233 | Jaenicke et al. | Feb. 16, 1943 |
| 2,614,998 | Lea | Oct. 21, 1952 |
| 2,655,148 | Eberl et al. | Oct. 13, 1953 |
| 2,745,813 | Logemann | May 15, 1956 |
| 2,760,885 | Larsen | Aug. 28, 1956 |
| 2,889,299 | Ritson | June 2, 1959 |
| 2,962,458 | Bird et al. | Nov. 29, 1960 |

FOREIGN PATENTS

| | | |
|---|---|---|
| 1,156,882 | France | Dec. 23, 1957 |